(12) United States Patent
Boyington

(10) Patent No.: US 8,826,028 B1
(45) Date of Patent: Sep. 2, 2014

(54) CRYPTOGRAPHY SECURE INPUT DEVICE

(75) Inventor: Marcos Boyington, Riverside, CA (US)

(73) Assignee: Google Inc., Mountain View, CA (US)

( * ) Notice: Subject to any disclaimer, the term of this patent is extended or adjusted under 35 U.S.C. 154(b) by 190 days.

(21) Appl. No.: 12/945,613

(22) Filed: Nov. 12, 2010

(51) Int. Cl.
G06F 21/00 (2013.01)

(52) U.S. Cl.
USPC .......................................... 713/182; 713/150

(58) Field of Classification Search
USPC .......................................................... 713/182
See application file for complete search history.

(56) References Cited

U.S. PATENT DOCUMENTS

| | | | |
|---|---|---|---|
| 4,333,090 A | | 6/1982 | Hirsch |
| 5,815,577 A * | | 9/1998 | Clark ............................. 380/52 |
| 7,089,214 B2 * | | 8/2006 | Wang ............................. 705/64 |
| 7,835,521 B1 * | | 11/2010 | Pinheiro ...................... 380/239 |
| 2003/0088772 A1 * | | 5/2003 | Gehrmann et al. ........... 713/175 |
| 2005/0198303 A1 * | | 9/2005 | Knauerhase et al. ......... 709/227 |
| 2006/0200467 A1 * | | 9/2006 | Ohmori et al. .................... 707/9 |
| 2007/0136589 A1 * | | 6/2007 | Magdi ............................ 713/171 |
| 2007/0192601 A1 * | | 8/2007 | Spain et al. .................... 713/168 |
| 2009/0300368 A1 * | | 12/2009 | Zilberstein et al. ........... 713/190 |
| 2010/0180120 A1 * | | 7/2010 | Frenkel et al. ................ 713/173 |
| 2010/0199089 A1 * | | 8/2010 | Vysogorets et al. .......... 713/168 |
| 2012/0054367 A1 * | | 3/2012 | Ramakrishnan et al. ..... 709/242 |

OTHER PUBLICATIONS

Jonathan M. McCune, Reducing the Trusted Computing Base for Applications on Commodity Systems, Jan. 13, 2009, School of Electrical and Computer Engineering Carnegie Mellon University.*

* cited by examiner

*Primary Examiner* — Joon H Hwang
*Assistant Examiner* — Abdulkader M Alriyashi
(74) *Attorney, Agent, or Firm* — Brake Hughes Bellermann LLP

(57) ABSTRACT

According to one general aspect, a method may include accessing a service via a computer. The computer may be coupled to a programmable human input device. The programmable human input device may be configured to directly receive user input from a human user and stores at least one encryption key. The method may include encrypting, by the programmable human input device, user confidential input using an encryption key associated with the service and stored within the programmable human input device. The method may also include transmitting the encrypted user confidential input to the service via the computer, wherein the computer is not configured to determine the unencrypted user confidential input from the encrypted user confidential input.

13 Claims, 6 Drawing Sheets

402 Accessing a secure financial service via a user's untrusted computer, wherein the untrusted computer is coupled to a programmable human input device, wherein the programmable human input device is configured to directly receive user input from a human user and configured to store a plurality of encryption keys 404 Receiving a request by the secure financial service to store an encryption key associated with the secure financial service within a memory included by the human input device 406 Determining if the encryption key associated with the secure financial service is allowed to be stored within the memory of the human input device

408 If the encryption key associated with the secure financial service is allowed to be stored within the memory of the human input device, storing the encryption key and the encryption key's association with the secure financial service within the memory of the human input device 410 Providing a first indication to a user if the received user input is being encrypted with a stored encryption key 412 Encrypting, by the programmable human input device, user authentication input using an encryption key associated with the secure financial service 414 Providing a second indication to the user if the received user input is not being encrypted with a stored encryption key 416 Transmitting the encrypted user authentication input to the secure financial service via the untrusted computer, wherein the untrusted computer is not configured to determine the unencrypted user authentication input from the encrypted user authentication input

FIG. 6

CRYPTOGRAPHY SECURE INPUT DEVICE

TECHNICAL FIELD

This description relates to security and confidential information, and specifically to a device to encrypt user input.

BACKGROUND

Security is a growing concern in the digital age. Frequently passwords and "secret" or confidential numbers (e.g., credit card numbers, account numbers, personal identification numbers (PINs), etc.) are lost or become known to third parties. Once these passwords or confidential information are no longer secret, various villains may use them to access a user's accounts and, for example, steal money, assets, or corporate secrets, etc. Further by automating the financial transaction process, the removal of information or money from an unfortunate victim's account may occur substantially instantaneously after the victim's password has become known to the villain.

One way to acquire a user's password or other confidential information is by the use of a fake or fraudulent web page. For example, a criminal may create a web site (e.g., www.chasse.com) that looks exactly or at least convincingly like an actual bank or credit card site (e.g., www.chase.com). A user, for example due to a typo when entering a web address, may arrive at the fake site and think they are actually using the proper legitimate site. This user may unsuspectingly enter their confidential information (e.g., username and password, credit card number, etc.). This fake site may then respond that the password is incorrect, while simultaneously using the user's password and username to access the legitimate site and steal the user's money. In some instances, to increase security a user may also be given a hardware or software tool that pseudo-randomly generates a one-time password. This one time password is usually valid for a few seconds. However, in an automated process a few seconds is more than enough time for a criminal to fraudulently access the user's accounts using that captured one-time password. Such techniques are generally referred to as "phishing."

Keyloggers are another form of obtaining a user's confidential information (e.g., username password, etc.). A keylogger, as the name suggests, generally records keys which are typed by a computer user. These keystrokes may (and often) contain passwords or PINs for financial institutions, thus compromising the user's data. As described above, this can result in stolen funds or data. Some common keyloggers are software-based and report typed keystrokes via a network (such as the internet). Often, these software keylogger programs may be installed on a user's computer system via a virus, or Trojan horse-style attack. Conversely, hardware-based keyloggers (such as at an Automatic Teller Machine (ATM) terminal) may require the stolen or logged data to be collected manually.

It is understood that the above are merely a few illustrative examples of means to breach or compromise a user authentication system or a secure communication in general. These examples are not intended to be exhaustive as the means of breaching a secure communication are legion and new schemes are constantly being devised.

SUMMARY

According to one general aspect, a method may include accessing a service via a computer. The computer may be coupled to a programmable human input device. The programmable human input device may be configured to directly receive user input from a human user and stores at least one encryption key. The method may include encrypting, by the programmable human input device, user confidential input using an encryption key associated with the service and stored within the programmable human input device. The method may also include transmitting the encrypted user confidential input to the service via the computer, wherein the computer is not configured to determine the unencrypted user confidential input from the encrypted user confidential input.

According to another general aspect, an apparatus may include a communications interface, a user input interface, a memory and a cryptographic circuit. The communications interface may communicatively couple the apparatus with a device, and receive a request for confidential information from a service via the device. The user input interface may directly receive user confidential input from a human user. The memory may store a plurality of encryption keys, wherein each of the encryption keys is associated with a respective service. The cryptographic circuit may encrypt the user confidential input using an encryption key associated with the service. The communications interface may also transmit the encrypted user confidential input to the secure service via the device, and wherein the device is not configured to determine the unencrypted user confidential input from the encrypted user confidential input.

According to another general aspect, a method of authenticating a user with a service may include receiving an authentication request from a device. The method may also include determining if a human input device, coupled with the device, includes an encryption key associated with the service. The method may include, if the human input device includes the encryption key associated with the service, receiving encrypted user input from the human input device via the device, wherein the encrypted user input is encrypted with the encryption key associated with the service, and decrypting the encrypted user input.

The details of one or more implementations are set forth in the accompanying drawings and the description below. Other features will be apparent from the description and drawings, and from the claims.

A system and/or method for encrypting information, substantially as shown in and/or described in connection with at least one of the figures, is set forth more completely in the claims.

BRIEF DESCRIPTION OF THE DRAWINGS

Like reference symbols in the various drawings indicate like elements.

DETAILED DESCRIPTION

Figure 1:
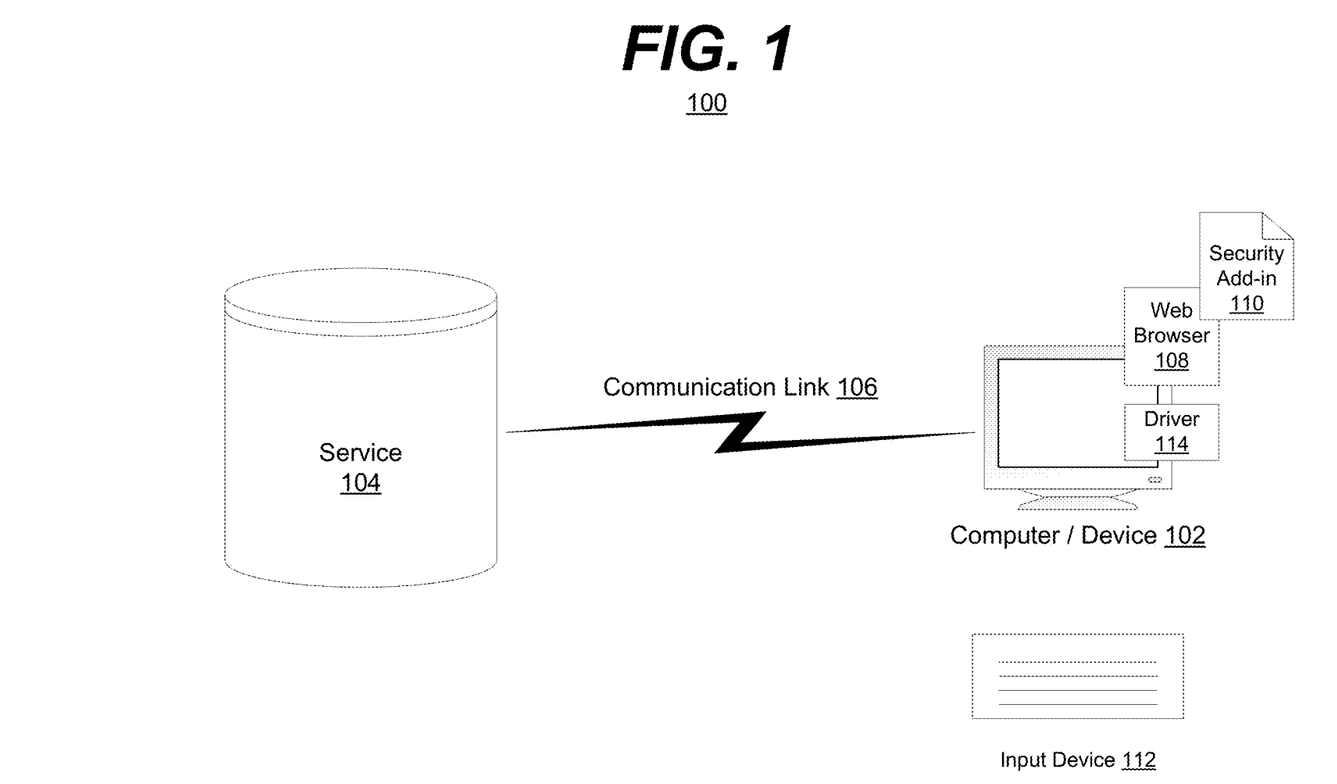
FIG. 1 is a block diagram of an example embodiment of a system in accordance with the disclosed subject matter.

FIG. 1 is a block diagram of an example embodiment of a system 100 in accordance with the disclosed subject matter.

In one embodiment, the system 100 may include a device 102, a service 104 and an input device 112.

In various embodiments, the device or computer 102 may include a local computer, smartphone, ATM or point-of-sales (POS) terminal, etc. This device 102 may be considered "untrusted" because it is capable of being compromised from a security point of view (e.g., virus, card swipper, keylogger, etc.). This device 102 may attempt to access a service 104.

In various embodiments, the service 104 may include a remote web server, local database, remote database, etc. This service 104 may include an apparatus that provides information in a secure format. Examples of such a service 104 may include a financial database that only allows transaction once a user has properly authenticated themselves to database, a business information system that stores confidential information, etc., although it is understood that the above are merely a few illustrative examples to which the disclosed subject matter is not limited. Although the disclosed subject matter is not limited to a specific embodiment, services in embodiments dealing with financial information may be referred to as "secure financial services."

In the illustrated embodiment, the device 102 and the service 104 may communicate via a communications link 106. In various embodiments, this communications link 106 may be a point-to-point link (e.g., a dedicated cable, etc.) that is presumed secure. In another embodiment, the communication link 106 may include an inherently insecure communications medium (e.g., the Internet, etc.).

In one embodiment, the input device 112 may include a device configured to receive user input (e.g., mouse movements, key presses, etc.) and communicate that user input to the service 104, via the device 102, in an encrypted manner. In this context the input device 112 may also be referred to as a human input device, human interface device (HID), a programmable human input device, and/or a secure input device. Various embodiments of the input device 112 may include a numerical keyboard, a more traditional "full-sized" keyboard (e.g., a keyboard with 101, 102, 104, 105, or more keys, etc.), a laptop-sized keyboard (e.g., a keyboard with ~85 keys and without a dedicated numeric keypad), a touch interface, a specialized keyboard, etc. although, it is understood that the above are merely a few illustrative examples to which the disclosed subject matter is not limited.

In a preferred embodiment, the device 102 may access a web site executing or providing a service 104. However, it is understood that this is merely a specific illustrative embodiment and that other embodiments are contemplated. This preferred embodiment merely provides a convenient and easily understandable use of the disclosed subject matter.

In such an embodiment, the device 102 may be executing or running a web browser 108. The user (not shown) may direct the web browser 108 to the web site associated with the service 104 (e.g., a bank's web site, etc.). In one embodiment, the service 104 may check whether or not the web browser 108 includes or is executing a security add-in or plug-in 110. Such a security add-in 110 may include a piece of software, firmware, hardware, or combination thereof that allows the service 104 to communicate with the device 102 in a way not traditionally available with typical web communication. In another embodiment, the security add-in 110 may be integrated into whatever user interface application the user employs to interact with the service 104 (e.g., an ATM interface, etc.).

In various embodiments, the service 104 may detect the presence of the input device 112. In such an embodiment, the service 104 may directly detect the presence of the input device 112. In one embodiment, this may occur via a client-side script or other code provided by the service 104. In another embodiment, the service 104 may indirectly detect the presence of the input device 112. For example, the service 104 may determine by the whether or not a security add-in 110 is present. The existence or lack thereof of the security add-in 110 may be employed as a proxy to detect whether or not the input device 112 is present.

Further, the device 102 may include or be executing a driver 114 that allows communication between the device 102 and the input device 110 at a very low level. A traditional keyboard driver may translate the serially received binary keypress codes of a traditional keyboard into a more complex hexadecimal alphanumeric code understood by the device 102. Similarly, the driver 114 may convert abstracted requests from the device 102 (e.g., write a cryptographic key, etc.) to a machine level command for the input device 112, and vice versa.

In various embodiments, the security add-in 110 may be configured to communicate with the input device 112 via the driver 114. In some embodiments, the security add-in 110 and the driver 114 may be integrated.

Returning to the specific illustrative embodiment, the service 104 may treat the existence of the security add-in 110 as a proxy for the existence of the input device 112. In another embodiment, the service 104 may be able to detect the existence of the input device 112 via other means (e.g., via the driver 114, etc.). If the service 104 determines that the desired security add-in 110 is not present or being executed, the service 104 may require that the security add-in 110 be present for a user to access the service 104. The user may then install the security add-in 110. Alternatively, the service 104 may simply fall back or resort to more traditional means of transferring confidential information.

If the service 104 determines that the security add-in 110 or input device 112 exists, the service 104 may proceed to download or provide an encryption key to the input device 112. In various embodiments, this encryption key may be the public portion of a public/private key encryption system or pair.

Traditionally, in a public/private encryption key pair system, a public encryption key may be made known to the public. This public key may be used to encrypt a message. This publically encrypted message may then only be decrypted with the private encryption key, which is held in confidence by the service 104 or, more generally, the agency that owns the public/private encryption key pair. Likewise, if the owner of the public/private key pair wishes to send a message, the message may be encrypted with the private key and then decrypted with the public key; while this is not a secret communication means, it may be used to prove that the message was sent by the owner of the private encryption key and no one else.

Figure 2:
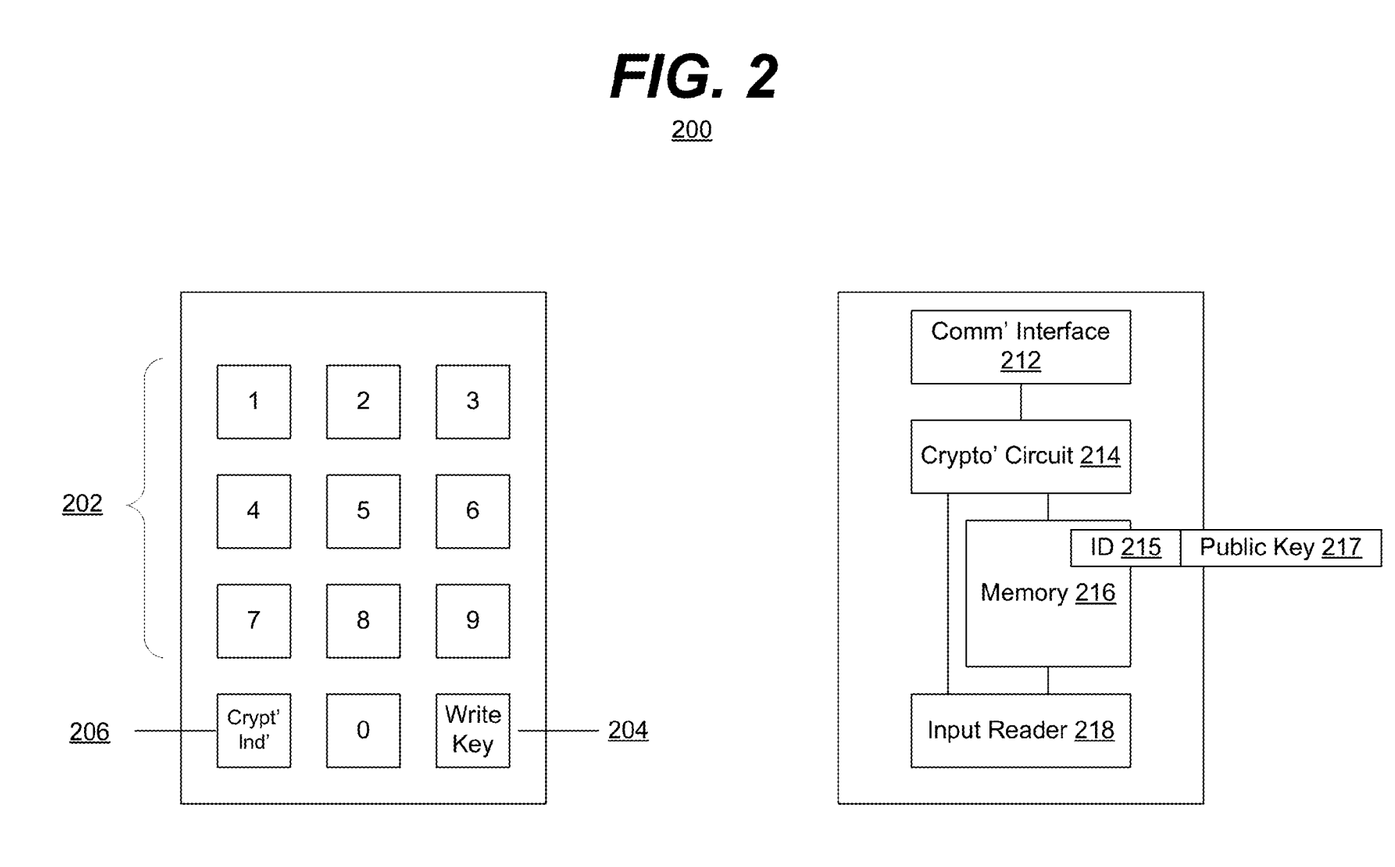
FIG. 2 is a block diagram of an example embodiment of an apparatus in accordance with the disclosed subject matter.

The input device 112 may receive the public encryption key and a service identifier (shown in FIG. 2). The public encryption key may be stored within the input device 112. The service identifier (ID) may be associated with the public encryption key and used to access the encryption key upon request. In such an embodiment, the service ID may be substantially unique (e.g, Globally Unique ID (GUID), Universally Unique ID (UUID), etc.), such that no two or more encryption keys may be associated with service 104.

The user may then be prompted to enter user input data (e.g., a password, etc.). In one embodiment, the service 104 may provide the web browser with a field that, from a user interface perspective, looks like a traditional password input field, but to the security add-in 110 looks like a field requiring user input via by the input device 112. While this specific embodiment makes use of the example of the secure communication between the input device 112 and the service 104 for authentication purposes, it is understood that other forms of secure communication may be desired and are within the scope of the disclosed subject matter (for example, a service 104 may require that all data entry may be encrypted, etc.).

In one embodiment, the user may type a password (e.g., an 8 digit number, etc.) via the input device 112. The input device 112 may then encrypt the user input with or using the public encryption key associated with the service 104. This encrypted user input may be transmitted to the device 102 (e.g., via driver 114, etc.). The device 102 may relay this encrypted user input to the service 104 (e.g., via the security add-in 110).

The device 102 may be unable to decrypt or otherwise read the encrypted user input in any meaningful way. In such an embodiment, the device 102 may not be able to discover what the user input. For example, a keylogger may be attached to a communications port between the input device 112 and the device 102 or the keylogger may have replaced or compromised the driver 114. A user may type an unencrypted or raw user input (e.g., "dog"), which the input device 112 may encrypt to the encrypted user input (e.g., "asd"). However, as the input device 112 only transmits or outputs the encrypted user input (e.g., "asd"), the keylogger may only record or log the encrypted user input (e.g., "asd") and will not see or have access to the unencrypted or raw user input (e.g., "dog"). Without the private portion of the service's 104 private/public key pair, the eavesdropper responsible for the keylogger may not discover the user's actual unencrypted password (e.g., "dog") and, therefore, not be able to access the user's account on the service 104.

In various embodiments, random, pseudo-random, or otherwise substantially random bits may be stored with the keys, so that the encrypted user input (e.g., "asd") will not always be the same encrypted value. The encrypted user input will be a different randomized value each time (e.g., "ryt"). In some embodiments, the secure server 104 may be configured to specify a timestamp or time value configured to expire encrypted values or user input after a certain amount of time has elapsed. In yet another embodiment, the service 104 may request that an additional value be added or combined (e.g., via a XOR operation, etc.) to the unencrypted user input. In such an embodiment, the additional value may expire upon the first use or first response to the service's 104 request that includes or makes use of the additional value.

FIG. 2 is a block diagram of an example embodiment of an apparatus or input device 200 in accordance with the disclosed subject matter. FIG. 2 displays both an internal and external view of the apparatus 200.

Externally, the apparatus 200 may include a series of physical keys or input means 202. As described above, the apparatus or input device 200 may include a software defined touch based system, a more traditional keyboard arrangement (e.g., a QWERTY key layout), or an application specific interface, etc.; the shown numerical keypad is merely one illustrative embodiment to which the disclosed subject matter is not limited.

The apparatus 200 may also include a "write authorization" key or button 204 configured to allow a user to indicate that an encryption key may be stored within a device. In one embodiment, as a result of the service asking to store a public encryption key, the user may be asked for permission to store the encryption key. This may prevent or reduce the likelihood that a rogue or fraudulent service may write an encryption key to the apparatus 200, allowing the fraudulent service to decrypt the resultant encrypted user input (for example, referring to the previous illustrative example, a fraudulent service would then be able to determine that "asd" really meant "dog"). In various embodiments, in order for an encryption key 217 to be stored within the apparatus 200 a user may be required to press the write authorization key or button 204, although it is understood that the above is merely one illustrative example to which the disclosed subject matter is not limited.

The apparatus 200 may further include a cryptographic indicator 206 configured to indicate to a user that any user input is being encrypted. In one embodiment, the cryptographic indicator 206 may include a light that lights up when the user input is being or will presently be encrypted. In various embodiments, this light may change colors between states (e.g., red for "no encryption", green for "encrypted user input", yellow for "writing an encryption key", etc.). In another embodiment, the cryptographic indicator 206 may also indicate which service is associated with the currently employed encryption key 217. In various embodiments, the cryptographic indicator 206 may include, for example, an audio indicator (e.g., a beep, double beep, etc.), a graphic user interface indication (e.g., a border or icon in the web browser, change the colors or graying out of the buttons in a software touch screen, etc.), a change in the other keys 202 (e.g., a change in the backlight color of the keys 202, etc.), etc., although it is understood that the above are merely a few illustrative examples to which the disclosed subject matter is not limited.

Internally, the apparatus 200 may include a communications interface 212, a cryptographic circuit 214, a memory 216, and an input reader or processor 218. In various embodiments, one or more of these elements may be integrated into a system on a chip (SOC), which may reduce the likelihood that the apparatus 200 may be compromised from a security perspective.

In one embodiment, the communications interface 212 may be configured to communicate with an device. For example, the communications interface 212 may communicate with the device via a protocol substantially compliant with the Universal Serial Bus (USB) standards, Bluetooth standards, IBM Personal System/2 (PS/2) standard, or another, possibly proprietary or custom, communications interface, etc. More specifically, the communications interface 212 may be configured to receive a request from a service for encrypted user input and transmit the encrypted user input to the requesting service. In various embodiments, the communications interface 212 may be configured to perform these actions via the device or a driver, thereof. In another embodiment, the communications interface 212 may be configured to communicate with the service without an device acting as an intermediary.

In various embodiments, the cryptographic circuit 214 may be configured to encrypt received user input based upon an encryption key associated with the requesting service. In some embodiments, the cryptographic circuit 214 may be configured to be updated (e.g., flashed, etc.) with updated cryptographic schemes. In such an embodiment, if a cryptographic scheme programmed into the circuit 214 becomes compromised, obsolete, or otherwise disfavored another scheme may be used. In a preferred embodiment, the cryptographic circuit 214 may be substantially inviolate, preventing or at least reducing the chances that the cryptographic circuit 214 may be compromised or unsecure.

The memory 216 may be configured to store a plurality of encryption keys 217, wherein each of the encryption keys 217 are associated with a respective service. As described above, the encryption key 217 may be stored or associated with a service ID 215. These service IDs 215 may act as the "key" or index portion of an associative array in which the encryption keys 217 act as the values in the array. A one-to-one relationship may exist between the encryption keys 217 and the service IDs 215. However, in another embodiment, the memory 216 may be configured such that many service IDs 215 may point to or be associated with a single encryption key 217.

For example, for web sites that have multiple physical servers corresponding to a single virtual server or service (e.g., for load balancing, etc.), multiple service IDs 215, one for each physical server, may be associated with a single encryption key 217 (for the virtual server or service as a whole). In such an embodiment, the service IDs 215 may correspond to domain names (e.g., www1.chase.com, www2.chase.com, etc.), Medium Access Control (MAC) addresses, Internet Protocol (IP) addresses, etc. However in a preferred embodiment, the service IDs 215 may be divorced from a physical identifier (e.g., IP address, etc.) and instead be tied to the virtual service. Such a scheme would decrease the confusion experienced by a user as they are moved from one physical server to another (e.g., via load balancing, etc.) and are asked repeatedly for permission to store a new encryption key 217. Alternatively, as the first encryption key 217 is stored, the association between the encryption key 217 and multiple service IDs 215 may be made at once.

In another example, a company may provide various secure services (e.g., customer relationship management (CRM), inventory management, payroll management, etc.) but provide only a single encryption key for any services provided by the company. Again, the company may associate a single encryption key 217 with multiple secure services. While only one encryption key is discussed in the above example, it is understood that for a many-to-one association to occur there merely needs to be less encryption keys than secure services provided by the company. It is understood that the above are merely a few illustrative examples to which the disclosed subject matter is not limited.

As described above, before an encryption key 217 or encryption key 217/service ID 215 pair may be written to the memory 216, a user may be required to approve, in one embodiment, the storing of the encryption key 217. In various embodiments, this may be done by pressing the write authorization key or button 204, although it is understood that the above is merely one illustrative example to which the disclosed subject matter is not limited. In one embodiment, this write authorization key or button 204 may directly provide a write enable signal to the memory 216. In another embodiment, the pressing of the write authorization key or button 204 (or other write permission indication depending upon the embodiment) may be interpreted by the input reader 218, which may then instruct the memory 216 to store the encryption key 217.

In one embodiment, the memory 216 may be configured to determine if the apparatus or input device 200 has stored an encryption key 217 associated with a requesting service. As described above, a service may determine or ask whether or not the encryption key associated with the service is already stored within the apparatus 200. As part of this, the service may transmit a service ID (e.g., service ID 215) to the apparatus 200. As described above, the memory 200 may then use or employ the received service ID 215 to determine if an associated encryption key 217 is already stored by the memory 216. In such an embodiment, the memory 216 may include a content addressable memory (CAM). In another embodiment, the cryptographic circuit 214 or other component may assist to initiate this determination.

In various embodiments, the apparatus 200 and the memory 216 may be configured to revoke or replace an encryption key 217. For example, each encryption key 217 may be associated with an expiration date (not shown), after which the encryption key 217 may no longer be used. In another embodiment, a service may request that its associated encryption key 217 be overwritten, etc. It is understood that the above are merely a few illustrative examples to which the disclosed subject matter is not limited. However, in some embodiments, the memory 216 may only be configured to be written to once per service ID 215 (e.g., a write-once/read many (WORM) memory, etc.) or otherwise the memory 216 may include tamper resistant or tamperproof features and structures. In a less preferred embodiment, the memory 216, or a portion thereof, may be removable.

In one embodiment, the apparatus 200 may include an input reader 218 configured to receive user input. In various embodiments, the input reader 218 may convert the signals generated by the pressing and releasing of physical keys 202 into usable or more traditionally encoded user input signals (e.g., American Standard Code for Information Interchange (ASCII), etc.). In another embodiment, the input reader 218 may be configured to convert the values generated by a software-based user interface (e.g., a touchscreen, graphical user interface, etc.) that generates the input means 202 into more traditionally encoded user input signals.

Figure 3:
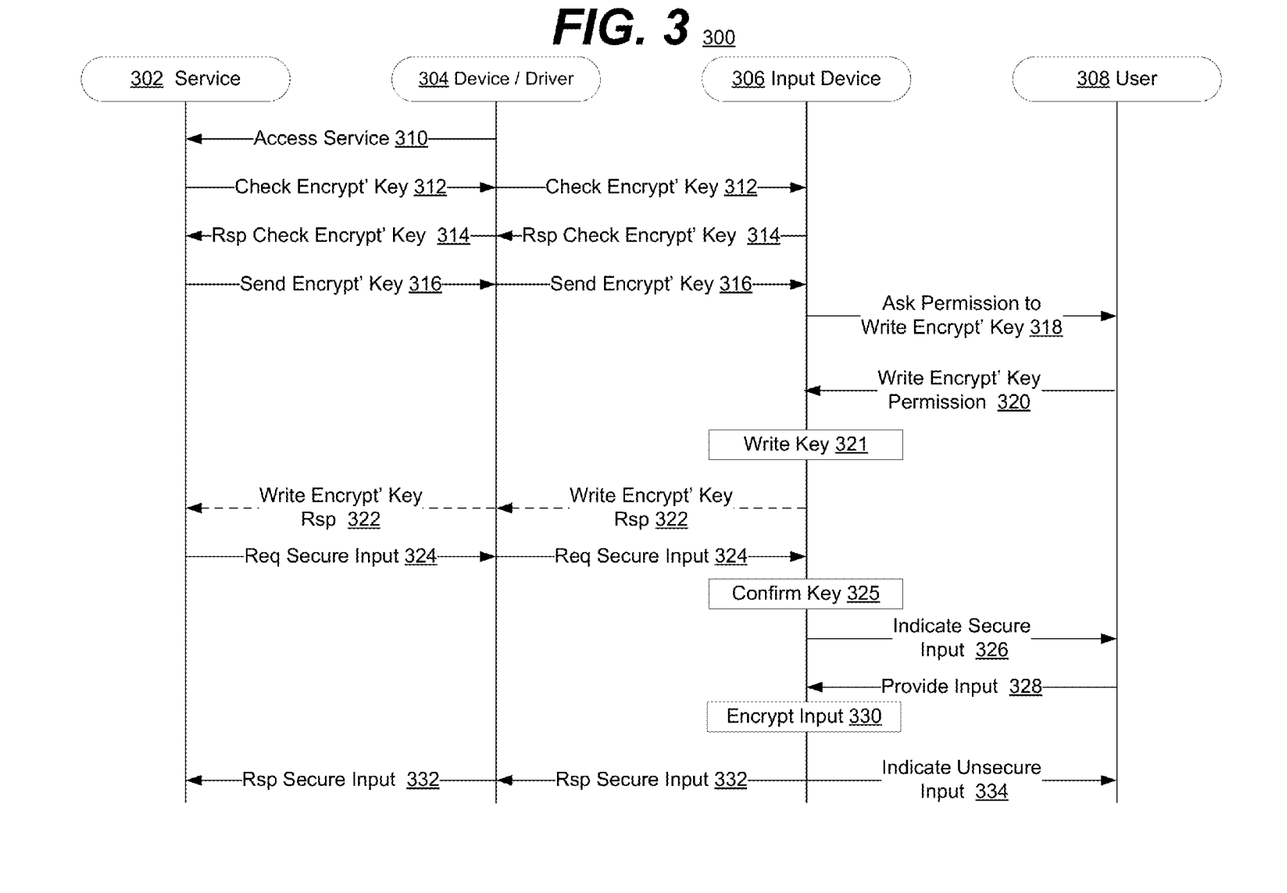
FIG. 3 is a diagram of an example embodiment of a system in accordance with the disclosed subject matter.

FIG. 3 is a diagram of an example embodiment of a system 300 in accordance with the disclosed subject matter. In various embodiments, the system 300 may include a service 302, a device 304 or the driver executed by such a device, an input device 306, and a user 308. FIG. 3 illustrates a rough timing diagram of the interactions between these devices in one embodiment of system 300.

Action 310 illustrates that, in one embodiment, the device 300 (e.g., a computer, web browser, specialized application, etc.) may access or request access to a service 302 (e.g., a server, etc.), as described above. Action 312 illustrates that upon accessing the service 302 or at least accessing the secure portion of the service 302, the service 302 may check or otherwise request that a determination be made as to whether or not an encryption key associated with the service 302 is stored by the input device 306. This request or check may be passed from the device 304 to the input device 306. In various embodiments, the Action 324 and the Action 312 may be combined into a single action, as described below.

Action 314 illustrates that, in one embodiment, the input device 304 may respond that no such encryption key exists or is associated with the service 302. This response may be transmitted via the device 304. Such a message may also be transmitted to the service 302 if an associated encryption key is expired or otherwise invalidated (e.g., corrupt, compromised, etc.). In another embodiment, if an encryption key does exist and is associated with service 302 a message indicating such may be transmitted to service 302. In such an embodiment, the service 302 may then proceed directly with Action 324.

Action 316 illustrates that, in one embodiment, the service 302 may transmit the encryption key and, in some embodiments, a service ID and other associated information (e.g., expiration date, etc.) to the input device 306 via the device 304, as described above. Action 318 shows that the input device 306 may then confirm with the user 308 that authorization is given to write or store the encryption key in memory. Action 320 illustrates the case in which the user 308 consents to storing the encryption key (e.g., via a write authorization key or button 204, etc.). Action 321 illustrates that upon the consent of the user 308, the encryption key may be stored within the input device 306 and associated with the service (e.g., via a service ID, etc.).

Action 322 illustrates that, in one embodiment, the input device 306 may communicate to the service 302 (via input device 304) that the encryption key has been properly stored. In another embodiment, if the user 308 had not consented to the storing of the encryption key, this refusal or other failure to store the encryption key may also be communicated to the service 302.

Action 324 illustrates that, in one embodiment, the service 302 may request secure user input from the input device 306. The service 302 may include an identifier (e.g., service ID, etc.) with or as part of the message to identify the service 302 and facilitate the proper identification of the encryption key to use when encrypting the secure user input. Action 325 illustrates that, in one embodiment, the input device 306 may identify or determine which of a plurality of encryption keys stored within the input device 306 is associated with the requesting service 302.

As described above, in various embodiments, Actions 324 and 312 may be combined into a single message. In such an embodiment, if no encryption key is associated with the requesting service 302 this may be communicated immediately via Action 332 (skipping, for example, Actions 326 and 330, etc.). In this instance, Action 332 may be similar or identical to Action 314. After which the encryption key writing technique described above (e.g. Actions 316, etc.) may occur.

Action 326 illustrates that, in one embodiment, the input device 306 may indicate to the user 308 that any user input that occurs via input device 306 (or a predetermined portion thereof, e.g., the numerical keypad portion of a 101+ physical key keyboard, etc.) will be encrypted, as described above. For example, this may include the use of the cryptographic indicator 206 of FIG. 2. Action 328 indicates that the user 308 may provide user input via input device 306.

Action 330 illustrates that, in one embodiment, this user input may be encrypted using the encryption key associated with the service 302, as described above. Action 332 illustrates that this secure or encrypted user input may then be transmitted to the requesting service 302. Action 334 shows that an indication may be made to a user 308 that the user input entered via the input device 306 is no longer secure and will not be encrypted with an encryption key.

It is understood that the above are merely a few illustrative examples to which the disclosed subject matter is not limited. In various embodiments, the Actions illustrated may be reduced, expanded, or re-ordered. In other embodiments, additional Actions may be added or modified to adjust for more complex situations (e.g., multiple secure services, etc.).

Figure 4:
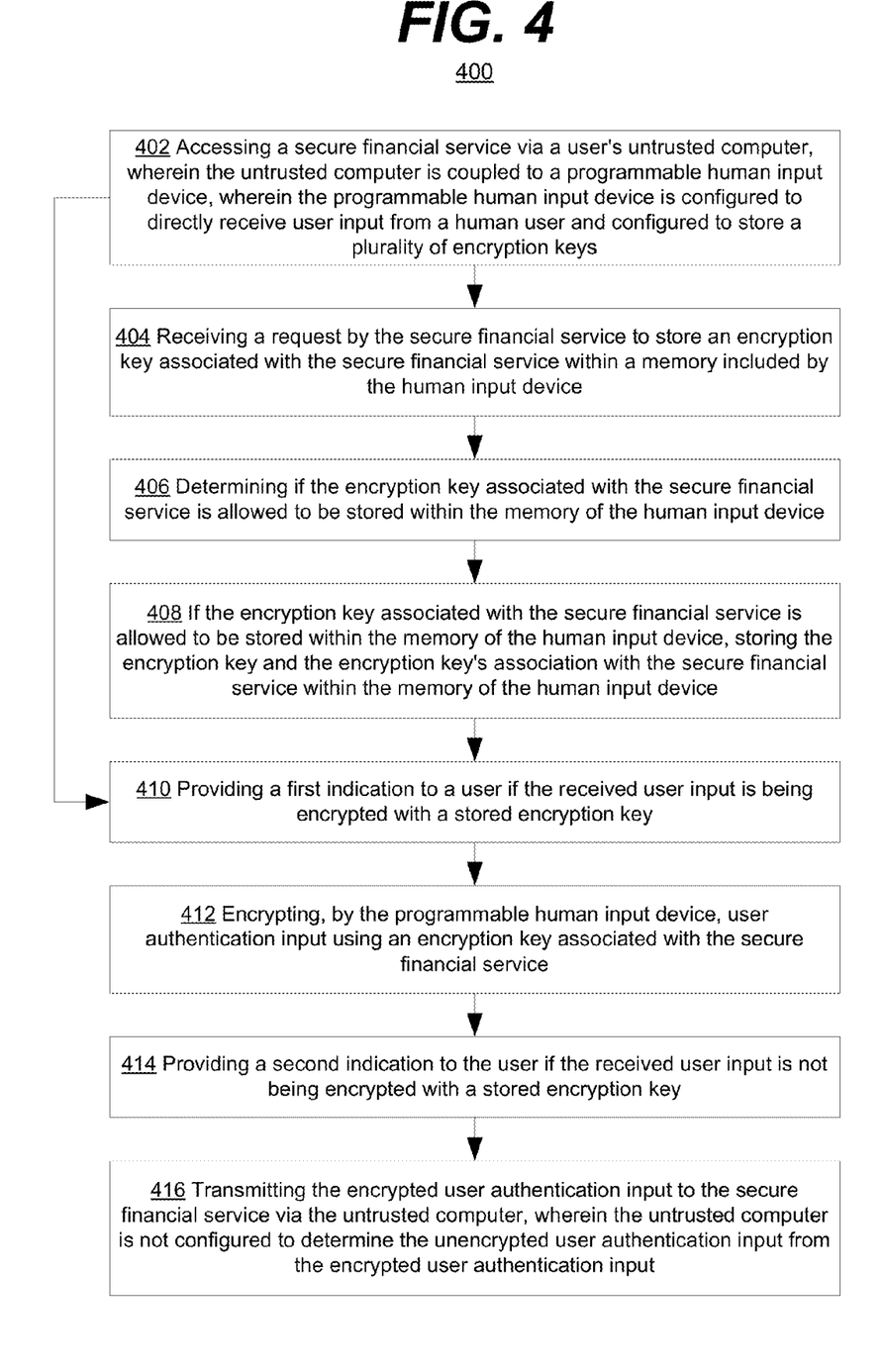
FIG. 4 is a flow chart of an example embodiment of a technique in accordance with the disclosed subject matter.

FIG. 4 is a flow chart of an example embodiment of a technique in accordance with the disclosed subject matter. In various embodiments, the technique 400 may be used or produced by the systems such as those of FIG. 1, 2, 3, or 6, although it is understood that the above are merely a few illustrative examples to which the disclosed subject matter is not limited. It is understood that the disclosed subject matter is not limited to the ordering of or number of actions illustrated by technique 400.

It is understood that while FIG. 4 is an illustrative embodiment within the context of a secure financial service and an authentication request these are merely a few illustrative examples to which the disclosed subject matter is not limited. In various embodiments, the technique illustrated by FIG. 4 may be employed with relation to other services and exchanges of confidential information. Further, it is understood that the term "computer" is used in the broadest sense and not limited to a desktop or laptop computer and may include specialized or non-traditional computer devices (e.g., ATMs, kiosks, airport check-in terminals, point-of-sale devices, etc.).

Block 402 illustrates that, in one embodiment, a secure financial service or more generally a service may be accessed via a user's computer, as described above. In such an embodiment, the computer may be coupled to a programmable human input device, as described above. The programmable human input device may be configured to directly receive user input from a human user and configured to store a plurality of encryption keys, as described above. In some embodiments, accessing may include accessing a secure financial service via a user's computer, and informing the secure financial service that the programmable human input device is coupled to the computer, as described above. Accessing may further include receiving a request for authentication from the secure financial service, wherein the request indicates that the authentication is to be encrypted, by the programmable human input device, before being transmitted to the secure financial service, as described above.

In various embodiments, accessing may include detecting a request by the secure financial service to receive encrypted user authentication input, as described above. In such an embodiment, accessing may further include receiving an identifier configured to indicate which encryption key is associated with the secure financial service, as described above. As described above, in various embodiments, each of the stored encryption keys includes a public encryption key portion of a public/private encryption key pair. In various embodiments, one or more of the action(s) illustrated by this Block may be performed by the apparatuses or systems of FIG. 1, 2, 3, or 6, the service, device, and input device of FIG. 1, 2, or 3, as described above.

Block 404 illustrates that, in one embodiment, a request by the secure financial service to store an encryption key associated with the secure financial service within a memory included by the human input device may be received, as described above. In various embodiments, Block 404 may be skipped or otherwise avoided and the technique 400 may proceed directly to Blocks 410 or 412, as described above in reference to FIG. 3. In various embodiments, one or more of the action(s) illustrated by this Block may be performed by the apparatuses or systems of FIG. 1, 2, 3, or 6, the service, device, and input device of FIG. 1, 2, or 3, as described above.

Block 406 illustrates that, in one embodiment, a determination may be made as to whether or not the encryption key associated with the secure financial service is allowed to be stored within the memory of the human input device, as described above. In various embodiments, this may include asking the user for permission to store the encryption key, as described above. In various embodiments, one or more of the action(s) illustrated by this Block may be performed by the apparatuses or systems of FIG. 1, 2, 3, or 6, the service, device, and input device of FIG. 1, 2, or 3, or the write authorization button 204 or memory 216 as described above.

Block 408 illustrates that, in one embodiment, if the encryption key associated with the secure financial service is allowed to be stored within the memory of the human input device, the encryption key and the encryption key's association with the secure financial service may be stored within the memory of the human input device, as described above. In various embodiments, one or more of the action(s) illustrated by this Block may be performed by the apparatuses or systems of FIG. 1, 2, 3, or 6, the service, device, and input device of FIG. 1, 2, or 3, or the memory 216 as described above.

Block 410 illustrates that, in one embodiment, a first indication may be provided to a user if the received user input is being encrypted with a stored encryption key, as described above. As described above, this indication may include a light or other user interface element. In various embodiments, one or more of the action(s) illustrated by this Block may be performed by the apparatuses or systems of FIG. 1, 2, 3, or 6, the service, device, and input device of FIG. 1, 2, or 3, or the cryptographic indication key 206 as described above.

Block 412 illustrates that, in one embodiment, the programmable human input device may encrypt the user authentication input using an encryption key associated with the secure financial service, as described above. In some embodiments, encrypting may include determining if an encryption key stored by the programmable human input device is associated with the secure financial service, as described above. In another embodiment, encrypting may include encrypting the received user input via a dedicated cryptography circuit, as described above. In various embodiments, one or more of the action(s) illustrated by this Block may be performed by the apparatuses or systems of FIG. 1, 2, 3, or 6, the service, device, and input device of FIG. 1, 2, or 3, or the cryptographic circuit 214 as described above.

Block 414 illustrates that, in one embodiment, a second indication may be provided to a user if the received user input is not being encrypted with a stored encryption key, as described above. As described above, this indication may include a light or other user interface element. In various embodiments, one or more of the action(s) illustrated by this Block may be performed by the apparatuses or systems of FIG. 1, 2, 3, or 6, the service, device, and input device of FIG. 1, 2, or 3, or the cryptographic indication key 206 as described above.

Block 416 illustrates that, in one embodiment, the encrypted user authentication input may be transmitted to the secure financial service via the computer, as described above. In such an embodiment, the computer may not be configured to determine the unencrypted user confidential input from the encrypted user confidential input, as described above. In various embodiments, transmitting may include transmitting the encrypted user confidential input from the human input device to a driver module of the computer configured to manage communication between the computer and the human input device, as described above. In various embodiments, one or more of the action(s) illustrated by this Block may be performed by the apparatuses or systems of FIG. 1, 2, 3, or 6, the service, device, and input device of FIG. 1, 2, or 3, or the communications interface 212 as described above.

Figure 5:
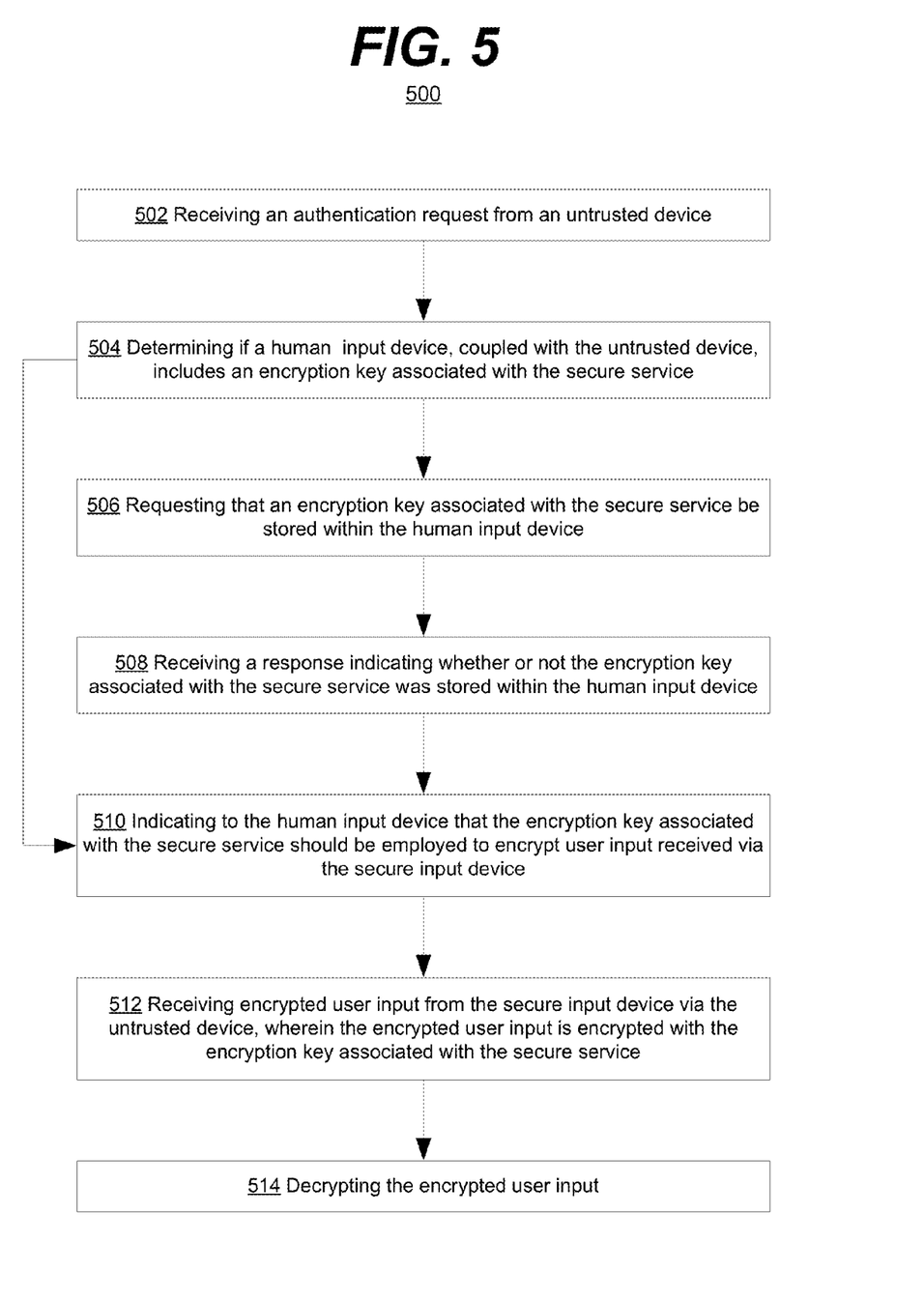
FIG. 5 is a flow chart of an example embodiment of a technique in accordance with the disclosed subject matter.

FIG. 5 is a flow chart of an example embodiment of a technique in accordance with the disclosed subject matter. In various embodiments, the technique 500 may be used or produced by the systems such as those of FIG. 1, 2, 3, or 6. Although, it is understood that the above are merely a few illustrative examples to which the disclosed subject matter is not limited. It is understood that the disclosed subject matter is not limited to the ordering of or number of actions illustrated by technique 500.

It is understood that while FIG. 5 is an illustrative embodiment within the context of a secure financial service and an authentication request these are merely a few illustrative examples to which the disclosed subject matter is not limited. In various embodiments, the technique illustrated by FIG. 5 may be employed with relation to other services and exchanges of confidential information. Further, it is understood that the term "computer" is used in the broadest sense and not limited to a desktop or laptop computer and may include specialized or non-traditional computer devices (e.g., ATMs, kiosks, airport check-in terminals, point-of-sale devices, etc.).

Block 502 illustrates that, in one embodiment, a secure financial service or more generally receive an confidential request from an device, as described above. In various embodiments, one or more of the action(s) illustrated by this Block may be performed by the apparatuses or systems of FIG. 1, 2, 3, or 6, the service, device, and input device of FIG. 1, 2, or 3, as described above.

Block 504 illustrates that, in one embodiment, the service may determine if a human input device is coupled with the device, and includes an encryption key associated with the service, as described above. In various embodiments, this determination may include determining, via a field associated with user confidential, whether or not the device is coupled with the human input device, as described above. As described above, a service may provide the web browser or other authentication interface with a field that, from a user interface perspective, looks similarly a traditional password input field, but to the authentication interface or an security add-in associated with the authentication interface looks like a field requiring user input via by the input device. In various embodiments, this field may include a web-based markup tag indicating that a plug-in, as described above, may be used to input user data. In such an embodiment, determining may include transmitting, to the device, an identifier configured to indicate an encryption key associated with the service, as described above. In some embodiments, determining may also include receiving a response, from the human input device, indicating whether or not the human input device includes an encryption key associated with the service, as described above. In various embodiments, one or more of the action(s) illustrated by this Block may be performed by the apparatuses or systems of FIG. 1, 2, 3, or 6, the service, device, and input device of FIG. 1, 2, or 3, as described above.

Block 506 illustrates that, in one embodiment, the service may request that an encryption key associated with the service be stored within the human input device, as described above. Block 508 illustrates that, in one embodiment, the service may receive a response indicating whether or not the encryption key associated with the service was stored within the human input device, as described above. In various embodiments, one or more of the action(s) illustrated by this Block may be performed by the apparatuses or systems of FIG. 1, 2, 3, or 6, the service, device, and input device of FIG. 1, 2, or 3, as described above.

Block 510 illustrates that, in one embodiment, the service may indicate to the human input device that the encryption key associated with the service should be employed to encrypt user input received via the secure input device, as described above. In various embodiments, one or more of the action(s) illustrated by this Block may be performed by the apparatuses or systems of FIG. 1, 2, 3, or 6, the service, device, and input device of FIG. 1, 2, or 3, as described above.

Block 512 illustrates that, in one embodiment, after a user has input data, the service may receive encrypted user input from the secure input device via the device, wherein the encrypted user input is encrypted with the encryption key associated with the service, as described above. Block 514 illustrates that, in one embodiment, the service may then decrypt this encrypted user input, as described above. In various embodiments, this encryption and decryption may employ a public/private encryption key pair, as described above. In various embodiments, one or more of the action(s) illustrated by this Block may be performed by the apparatuses or systems of FIG. 1, 2, 3, or 6, the service, device, and input device of FIG. 1, 2, or 3, as described above.

Figure 6:
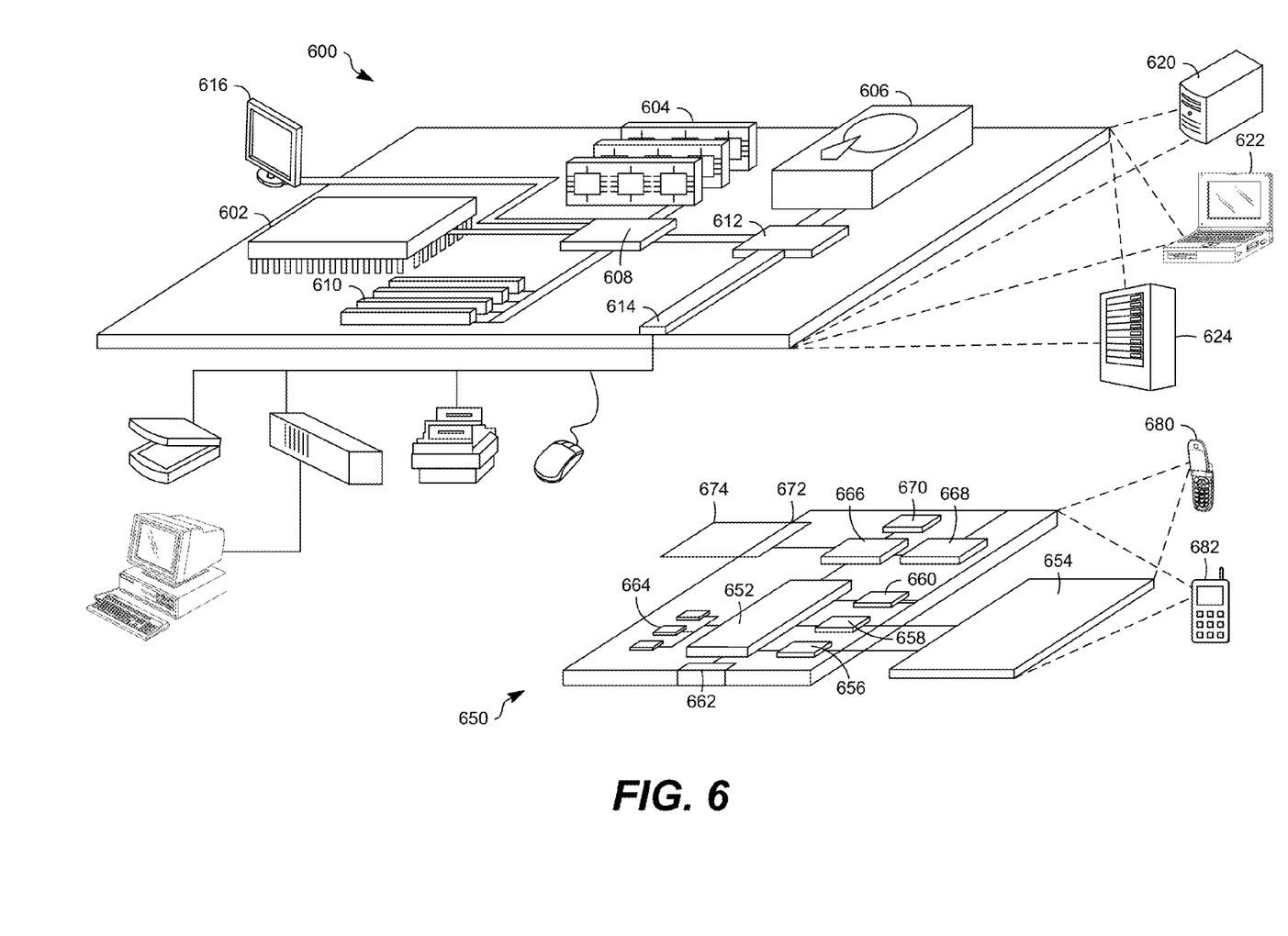
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:

accessing a service via a computer, wherein the computer is coupled to a programmable human input device, wherein the programmable human input device is configured to directly receive user input from a human user and store a plurality of encryption keys in association with corresponding service identifiers, wherein each encryption key of the plurality of encryption keys is stored in association with a corresponding service identifier that identifies a particular service;

receiving, by the programmable human input device, a service identifier associated with the accessed service, the accessed service being a virtual service associated with at least one of a plurality of physical servers having physical identifiers, wherein the service identifier identifies the virtual service as a whole but does not identify any of the physical servers physical identifiers;

determining, by the programmable human input device, that an encryption key associated with the accessed service is not one of the plurality of encryption keys stored in the programmable human input device based on the service identifier;

receiving, by the programmable human input device, the
encryption key associated with the accessed service;
soliciting, by the programmable human input device, permission from a user of the programmable human input device to store the received encryption key;
authorizing, by the programmable human input device, storage of the received encryption key based on user input received through the programmable human input device, wherein permission is not solicited again when the virtual service is moved from one physical server to another physical server;
storing, by the programmable human input device, the encryption key in association with the service identifier of the accessed service when the received encryption key is authorized for storage in the programmable human input device;
encrypting, by the programmable human input device, user confidential input using the encryption key associated with the accessed service and stored within the programmable human input device;
providing, by the programmable human input device, a visual indicator indicating which service is associated with a currently employed encryption key; and
transmitting the encrypted user confidential input to the accessed service via the computer, wherein the computer is not configured to determine unencrypted user confidential input from the encrypted user confidential input.

2. The method of claim 1, wherein the encrypting, by the programmable human input device, user confidential input comprises:
determining if the encryption key stored by the programmable human input device is associated with the accessed service.

3. The method of claim 1, wherein each of the stored encryption keys includes a public encryption key portion of a public/private encryption key pair.

4. The method of claim 1, wherein the accessing a service comprises:
accessing the service via the computer;
informing the accessed service that the programmable human input device is coupled to the computer; and
receiving a request for authentication from the accessed service, wherein the request indicates that the authentication is to be encrypted, by the programmable human input device, before being transmitted to the accessed service.

5. The method of claim 1, wherein the encrypting received user confidential input based upon the encryption key includes encrypting the received user confidential input via a dedicated cryptography circuit.

6. The method of claim 1, further comprising:
providing a first indication to the user when the user confidential input is being encrypted with the encryption key associated with the accessed service; and
providing a second indication to the user when the user confidential input is not being encrypted with the encryption key associated with the accessed service.

7. The method of claim 1, wherein the transmitting the encrypted user confidential input to the accessed service via the computer comprises:
transmitting the encrypted user confidential input from the programmable human input device to a driver module of the computer configured to manage communication between the computer and the programmable human input device.

8. An apparatus comprising:
a communications interface to communicatively couple the apparatus with a device, and receive a service identifier from a service via the device, the service being a virtual service associated with at least one of a plurality of physical servers having physical identifiers, wherein the service identifier identifies the virtual service as a whole but does not identify any of the physical servers physical identifiers;
a memory to store a plurality of encryption keys and corresponding service identifiers, wherein each encryption key of the plurality of encryption keys is stored in association with a corresponding service identifier that identifies a particular service, wherein a processor associated with the memory determines that an encryption key associated with the service is not one of the plurality of encryption keys stored in the memory based on the service identifier, and the communications interface receives the encryption key associated with the service;
a write authorization component to solicit permission from a user to store the received encryption key, the write authorization component configured to indicate a user's permission to store the received encryption key,
wherein the memory stores the encryption key in association with the service identifier upon activation of the write authorization component, wherein the user's permission is not solicited again when the virtual service is moved from one physical server to another physical server;
a cryptographic circuit to encrypt user confidential input using the encryption key associated with the service and stored within the memory; and
a visual cryptographic indicator configured to indicate which service is associated with a currently employed encryption key,
wherein the communications interface is further to transmit the encrypted user confidential input to the service via the device, and
wherein the device is not configured to determine an unencrypted user confidential input from the encrypted user confidential input.

9. The apparatus of claim 8, wherein each of the stored encryption keys includes a public encryption key portion of a public/private encryption key pair.

10. The apparatus of claim 8, wherein cryptography circuit includes a dedicated cryptography circuit.

11. The apparatus of claim 8, further comprising a cryptographic indicator to provide a first indication to the user when the user confidential input is being encrypted with the encryption key associated with the service and provide a second indication to the user when the received user confidential input is not being encrypted with the encryption key associated with the service.

12. The apparatus of claim 8, wherein the communications interface is to communicate with the device via a driver module of the device that is configured to manage communication between the device and the apparatus.

13. A non-transitory computer readable medium storing instructions, when executed by at least one processor, are configured to:
store a plurality of encryption keys and corresponding service identifiers, wherein each encryption key of the plurality of encryption keys is stored in association with a corresponding service identifier that identifies a particular service;
access a service via a computer coupled to a programmable human input device;

receive a service identifier associated with the accessed service, the accessed service being a virtual service associated with at least one of a plurality of physical servers having physical identifiers, wherein the service identifier identifies the virtual service as a whole but does not identify any of the physical servers physical identifiers;

determine that an encryption key associated with the accessed service is not one of the plurality of stored encryption keys based on the service identifier;

receive the encryption key associated with the accessed service;

solicit permission from a user of the programmable human input device to store the received encryption key;

authorize storage of the received encryption key based on user input received through the programmable human input device, wherein permission is not solicited again when the virtual service is moved from one physical server to another physical server;

store the encryption key in association with the service identifier of the accessed service when the received encryption key is authorized for storage in the programmable human input device;

encrypt user confidential input using the encryption key associated with the accessed service;

provide a visual indicator indicating which service is associated with a currently employed encryption key; and transmit the encrypted user confidential input to the accessed service via the computer, wherein the computer is not configured to determine an unencrypted user confidential input from the encrypted user confidential input.

* * * * *